Sept. 20, 1949.　　　F. T. COURT　　　2,482,657
POWER LIFT
Filed June 13, 1944
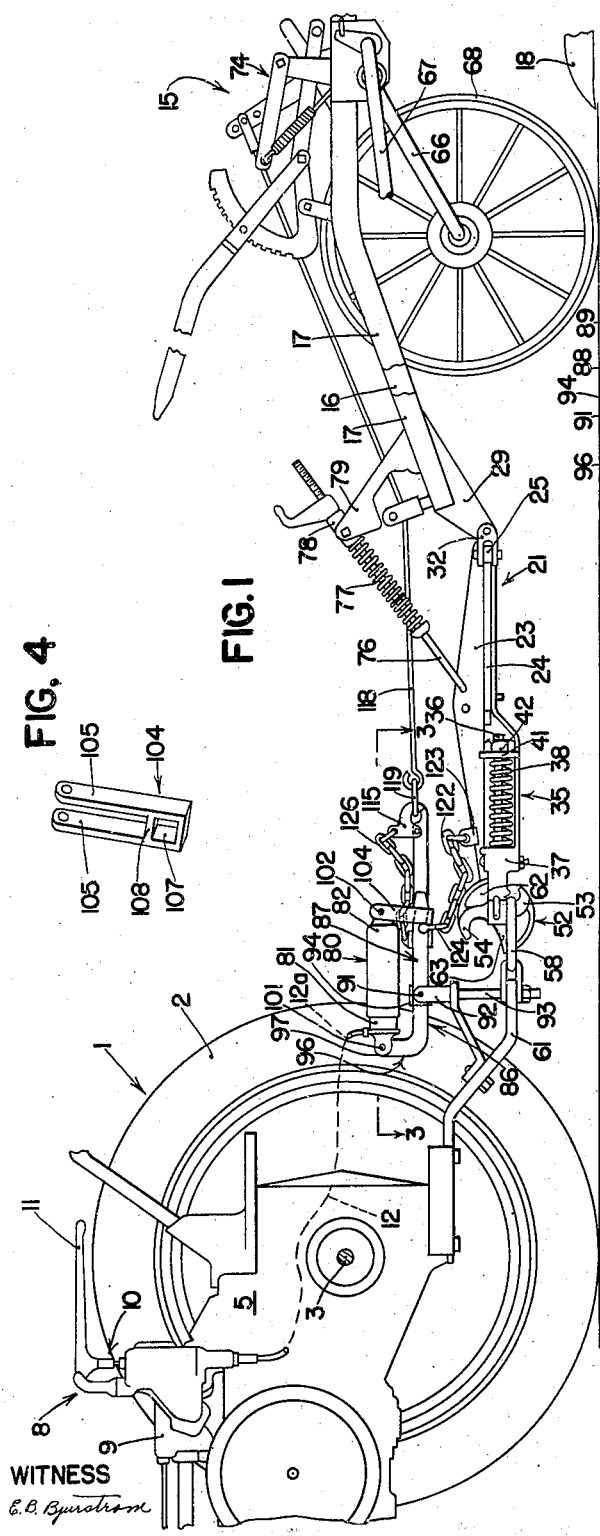
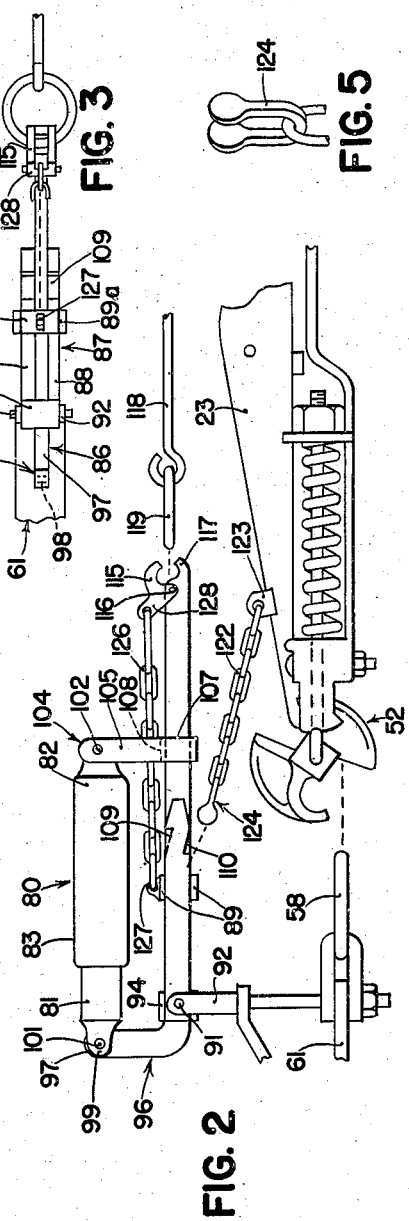
INVENTOR.
FRANK T. COURT Patented Sept. 20, 1949

2,482,657

UNITED STATES PATENT OFFICE 2,482,657

POWER LIFT

Frank T. Court, Moline, Ill., assignor to Deere & Company, Moline, Ill., a corporation of Illinois Application June 13, 1944, Serial No. 540,113

10 Claims. (Cl. 97—50)

The present invention relates generally to agricultural implements and more particularly to towed or trailing implements adapted to be drawn by a farm tractor or the like.

The object and general nature of the present invention is the provision of new and improved power operated means acting through a pulling or tension connection between the tractor and the implement for adjusting the latter, with mechanism adapted to release or disconnect the pulling connection in the event the implement becomes disconnected from the tractor as by an overload. More specifically, it is a feature of this invention to provide means on the tractor for supporting a power operated device, such as a ram cylinder, with means responsive to a disconnection of the implement from the tractor for releasing the anchored end of the ram unit, with cooperating means also responsive, in effect, to the release of the implement from the tractor, for disconnecting the other end of the ram unit from the implement.

These and other objects and advantages of the present invention will be apparent to those skilled in the art after a consideration of the following detailed description of the preferred embodiment.

In the drawings:

Figure 1 is a side view of a tractor propelled plow in which the connections between the plow and the tractor are shown as releasable in accordance with the principles of the present invention.

Figure 2 is an enlarged fragmentary view showing in particular the cylinder unit and its mounting, with the connections to the implement and the tractor in their released position.

Figure 3 is a fragmentary view taken generally along the line 3—3 of Figure 1 but with the cylinder unit removed in order to show the details of the cylinder carrier.

Figure 4 is a detail view of the member that releasably anchors the rear end of the cylinder unit to the cylinder carrier.

Figure 5 is a detail view of the detachable grip release dog.

Referring now to the drawings, the reference numeral 1 indicates a tractor which is more or less of conventional construction and hence has been illustrated only fragmentarily. The tractor 1 includes rear drive wheels 2 fixed to drive axles 3 that are journaled for rotation in a rear axle housing 4. The latter is secured to or forms a part of a transmission housing 5. The tractor 1 is equipped with a controlled source of fluid pressure, indicated in its entirely by the reference numeral 8 and which comprises a fluid pump driven from the shaft of the tractor governor 9 and suitable controlling valve mechanism 10 which is actuated by a valve lever 11. A fluid conduit in the form of a flexible hose connection 12 extends from the power unit 8 to a point of utilization, preferably a remotely located piston and cylinder unit or ram to which more detailed reference wil be made below. The present invention is not especially concerned with the particular details of the power unit 8, the same being preferably of the same construction as shown in United States Patent No. 2,340,474, issued February 1, 1944, to which reference may be made if necessary. Further description is therefore unnecessary except to point out that moving the valve lever 11 upwardly causes the fluid to be forced outwardly through the conduit 12 under pressure and releasing the lever 11 locks the fluid in the conduit 12 and associated connections. Depressing the lever 11 permits fluid to flow back into the power unit 8.

The present invention is particularly concerned with the provision of new and improved mechanism, deriving power from the power unit 8, for adjusting a towed or trailing implement drawn by the tractor 1, with the connections arranged so that the implement is connected with the tractor by a pulling connection that acts when adjusting the implement in the same direction as the pull of the tractor or the draft pull. Particularly, it is a feature of this invention to provide an automatic release for the pulling connection between the power unit of the tractor and the implement part to be adjusted so that the pul'ing connection can be immediately disconnected whenever the implement becomes disconnected from the tractor, as by an overload. Frequently, implements such as plows are connected to the tractor that draws them through some form of releasable hitch mechanism that automatically trips and disconnects the implement from the tractor when the loads become excessive, and according to the present invention the pulling or tension connection between the operating unit actuated by the tractor and the implement part to be adjusted can be automatically disconnected in the event the hitch trips.

A control of this kind may be provided for any kind of implement, but to illustrate the principles of the present invention, I have chosen to show an implement of the ground working type, namely, a plow, which is indicated in its entirety by the reference numeral 15. The plow 15 as illustrated is of the two-bottom towed type and includes a pair of plow beams 16 and 17 to the lower rear ends of which plow bottoms 18 are connected in the usual way. The forward ends of the beams 16 and 17 are connected to a hitch structure that is indicated in its entirety by the reference numeral 21 and which includes a longitudinal draft member 23 and a diagonal brace 24 that at their rear ends are connected to a transverse bar 25. Draft brackets 29, one for each of the beams 16 and 17, are connected to the forward ends of the plow beams and are connected by clevises 32 to the hitch bar 25.

The forward end of the draft member 23 is formed as a frame, indicated at 35 in Figure 1, in which a draft bolt 36 is slidably mounted. The frame 35 includes a casting 37 at the forward end of the draft member 23, and the draft bolt 36 is generally in the form of a U-shaped member, the ends of which are disposed within cushioning springs 38 that are confined between the rear end of the casting 37 and a slidable plate 41 which is apertured to receive the rear ends of the draft bolt 36. The ends of the draft bolt 36 are threaded to receive nuts 42 by which the plate 41 is held in place. The front end of the draft bolt 36 rotatably receives a rotatable coupling member 52 which is provided with two or more hook-like portions 53 and 54. The rotatable coupling member 52 is formed with a specially shaped hub section which is arranged to hold one or the other of the hook sections 53 or 54, in a position to receive a draft link 58 which connects the implement to the tractor drawbar 61. The rotatable coupling member also includes flanged sections 62 and 63 cooperating with the frame 35, particularly the front casting 37 thereof to hold the member 52 against rotation until the draft pull reaches an abnormal degree, whereupon the springs 38 will be compressed and the coupling member 52 rotated to free the link 58 from the front end of the hitch structure 21. A spring cushion release hitch of this type is shown in the U. S. patent to Carl G. Strandlund, No. 2,271,748, dated February 3, 1942.

Referring again to the implement 15, the latter includes a pair of crank axles 66 and 67 which are journaled for rocking movement in brackets that are secured, respectively, to the plow beams 16 and 17. Each of the crank axles 66 and 67 includes a laterally outwardly turned end upon which a ground wheel is mounted. In Figure 1, the ground wheel is indicated by the reference numeral 68 and normally operates in the previously opened furrow. The other ground wheel (not shown) is normally referred to as the land wheel of the plow. The crank axles are connected to swing together by an adjustable leveling linkage indicated in its entirety by the reference numeral 74 and which is substantially the same as the leveling linkage shown in the co-pending U. S. application filed by Theophilus Brown and myself, on June 26, 1941, Serial No. 399,852, now Patent No. 2,344,123. The hitch structure 21, which actually forms a part of the implement 15, is connected with the front ends of the beams 16 and 17 so as to be capable of vertical swinging movement, but this movement is normally restrained by a rod 76 pivoted to the hitch bar 23 and a spring 77 which encircles the rod 76 and bears against a sleeve 78 pivoted to a bracket 79 fixed to the plow beam 17. This structure tends to hold the hitch member 21 against vertical swinging relative to the beams 16 and 17.

The position of the crank axles 66 and 67 is controlled by the tractor hydraulic power unit 8 through mechanism which will now be described. Briefly, the mechanism is so arranged that the crank axles may be raised or lowered, relative to the plow frame, by energy transmitted from the tractor to the plow through a pulling or tension connection, yet the mechanism is so arranged that if the springs 38 should yield and the coupling member 52 release the implement from the tractor, the pulling or tension connection between the tractor power unit and the implement is also automatically released.

A hydraulic cylinder and piston unit, usually referred to as a ram unit, is indicated in Figure 1 by the reference numeral 80 and is connected to the rear end 12a of the flexible hose connection 12 so as to receive fluid under pressure from and to be controlled by the hydraulic valve unit 8 on the tractor. Briefly, the unit 80 includes a cylinder 81 and a piston 82 having a protecting sleeve 83 telescopically associated with the cylinder 81. Preferably, the unit 80 is mounted on the tractor drawbar 61 by means of a ram carrier 86, comprising a pair of relatively shiftable ram-receiving parts or members. One of the members, indicated at 87, includes two laterally spaced apart strap members 88 rigidly connected together at their rear ends by upper and lower cross bars 89. The ends of the lower cross bar project outwardly, as at 89a, and the strap members 88 are pivotally connected at their forward ends, as at 91, to a U-shaped yoke 92 pivoted, as at 93, to the tractor drawbar 61 for lateral swinging movement. Crossbars 94, similar to the rear crossbars 89, rigidly connect the forward ends of the strap members 88. The other member of the ram carrier is indicated by the reference numeral 96 and comprises a longitudinally extending bar having its forward end 97 upturned and formed with an opening 98. The bar 96 is slidably disposed between the strap members 88 and the two sets of cross straps 89 and 94. The ram 80 at its forward end is provided with a pair of apertured lugs 99 carrying a pin 101 which is adapted to be inserted in the opening 98. The rear end of the ram 80 is similarly formed with or carries a pair of apertured lugs in which a pin 102 is disposed. This pin serves to pivotally connect an anchoring member 104 to the rear end of the ram 80. The anchoring member 104 is releasably mounted on the rear ends of the strap members 88, and the member 104 includes a pair of upstanding apertured sections 105, mounted on the pin 102, and a yoke section 107 closely embracing the rear ends of the strap members 88, rearwardly of the rear cross members 89. The yoke section 107 is formed by a cross piece 108 welded to the two sides 105 of the anchoring yoke member 104.

As best shown in Figure 2, the upper edges of the rear end portions of the strap members 88 are notched, as at 109, and similarly the lower edges of the strap members 88 are notched as indicated at 110. The notches 110 are immediately to the rear of the lower rear cross strap 89, and the notches 109 and 110 are so formed as to receive the anchoring member 104 in a slightly cocked position, as shown in Figure 1. In this position the member 104 is latched or locked to the ram carrier member 87, but the dimensions of the yoke section 107 and cooperating parts on the ram carrier member 87 are such that the anchoring member 104 may be released from the carrier member 87 by a slight amount of counterclockwise rocking motion of the member 104, after which the member 104 may slide off the rear end of the carrier member 87. A latch 115 is pivoted, as at 116, to the rear end of the ram carrier member 96 and cooperates with a hook-like portion 117 of the member 96 to detachably or releasably receive a connecting ring 119 at the front end of a tension rod or link 118 that forms a pulling connection between the ram carrier member 96 and an arm 119 that is connected directly to the crank axle 67 and, through the linkage 74, to the other crank axle 66.

According to the principles of the present invention, mechanism is provided for disconnecting the tension link 118 from the member 96 whenever the implement is disconnected from the tractor. To this end, I provide a chain 122 permanently connected, as at 123, to the bar 23 and connected at its front end to a grip release dog 124 which is disposed between the front edge of the anchoring member yoke 107 and the lower rear crossbar 89. A second chain 126 is connected between a lug 127 on the upper rear crossbar 89 and an arm 128 forming a part of the latch 115. The lower cross bar 89 extends laterally outwardly beyond the sides of the bars 88, as shown in Figure 3.

The operation is substantially as follows. When, as shown in Figure 1, the plow is hitched normally to the tractor, the plow may be raised or lowered by actuating the valve 11. If the plow should strike an obstruction, sufficient to cause the hitch coupling member 52 to release, a continued forward movement of the tractor 1 will first tighten the chain 122. This will cause the grip release dog 124 to straighten the anchoring member 104 so that it may slide off the rear end of the ram carrier strap members 88. This occurs because as the tractor continues forwardly while the implement remains behind, the tension exerted through the link 118 and the member 96 pulls the ram 80 rearwardly in effect, disconnecting it from the ram carrier since the anchoring member 104 is unlatched therefrom. After the member 96 is thus shifted rearwardly the chain 126 is next tightened and then the chain 126 opens the latch 115 releasing the tension link 118 from all connection with the tractor or its ram unit 80. It is to be noted that while the chain 126 is sufficiently slack to permit all normal fore and aft movements of the shiftable ram carrier member 96, any excessive movement of the latter will result in releasing the latch 115 and disconnecting the tension member or pulling connection 118. Normally, the release of the latch 115 depends on the release of the anchoring member 104, and the release of the latter depends on the release of the hitch member 52. Reconnection is easily established after freeing the implement by backing the tractor and restoring the parts to the position shown in Figure 1. The same action occurs if the pin 92 breaks.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

I claim:

1. In an agricultural outfit including a propelling unit, an agricultural implement releasably connected with said tractor, said implement having a part to be adjusted, and said tractor having a power unit for adjusting said part; an implement power lift connection adapted to connect said implement part and said power unit and comprising a ram-receiving carriage including a pair of relatively movable members, one movably carried on the other, means releasably connecting said relatively movable members, a releasable connection adapted to connect said implement part and said one member, and means responsive to a release of the means releasably connecting said relatively movable members and a predetermined movement of said one member relative to the other for releasing said releasable connection.

2. For use in an agricultural outfit including a propelling unit to which an agricultural implement is releasably connected, a releasable pull connection adapted to extend between said unit and implement and movable generally fore and aft through a normal range for adjusting said implement, mechanism for releasing said pull connection, and means responsive to movement of said connection beyond said normal range for operating said releasing mechanism.

3. For use in an agricultural outfit including a propelling unit to which an agricultural implement is releasably connected, a longitudinally shiftable connection adapted to extend between said unit and implement and including a pair of separable sections and latch means for detachably connecting said sections, a support for at least one of said sections, and mechanism responsive to an excessive amount of movement of said longitudinally shiftable connection for separating said sections, said mechanism including a connection extending between said support and said latch means.

4. For use in the combination of a tractor, an implement having a part to be adjusted, and means releasably connecting said implement to said tractor; a ram unit, means for supporting said ram unit on the tractor, a tension connection between said ram unit and said implement part and including a releasable latch operative when released to interrupt said connection, and means responsive to movement of said tension connection relative to said supporting means for releasing said latch.

5. For use in the combination of a tractor, an implement having a part to be adjusted, and means releasably connecting said implement to said tractor; an implement power lift comprising a ram unit, a tension connection between said ram unit and said implement part and including a releasable latch operative when released to interrupt said connection, releasable anchoring means for the ram unit and adapted to take the reaction thereof when said ram unit acts through said tension connection for adjusting said implement part, means responsive to the release of said implement from the tractor for releasing said anchoring connection, and means responsive to the release of said anchoring connection for releasing said latch.

6. For use in the combination of a tractor, an implement having a part to be adjusted, and a releasable hitch connecting the implement with the tractor; an implement power lift comprising a ram unit, means adapted to mount one end of the ram unit on the tractor, said means including releasable means fixing said one end against movement in one direction relative to the tractor, a tension connection extending between the other end of said ram unit and said implement part, mechanism operative by the release of the implement from the tractor for releasing the releasable means fixing said one end of the ram unit to the tractor, and means responsive to the release of said releasable means for releasing said other end of the ram unit from its connection with the implement.

7. For use in the combination of a tractor, an implement having a part to be adjusted, and a releasable hitch connecting the implement with the tractor; an implement power lift comprising a ram unit, a pair of relatively movable members, one adapted to be mounted on the tractor and the other mounted on said one member, means on said members for receiving the ends of said ram unit, respectively, a releasable connection between said other member and said implement part, means responsive to the release of said implement hitch for releasing said ram unit from said one member, and means responsive to excessive movement of said other member for releasing said releasable connection.

8. An implement power lift adapted for use with a propelling unit, an implement releasably connected to the propelling unit, and a power device on said propelling unit; said implement power lift comprising releasable anchoring means adapted to connect one end of said power device with said propelling unit, a releasable connection adapted to extend from the other end of said power device to said implement to adjust the latter and including disconnectible sections, a first means operative upon release of the implement from said propelling unit for releasing said releasable anchoring means, and a second means also operative when the implement is released from the propelling unit for disconnecting said sections.

9. A release mechanism for an implement power lift, comprising a power unit supporting carriage including a pair of relatively movable members, one movably carried on the other, releasable means acting between said relatively movable members to prevent movement of said one member relative to the other in one direction, a releasable implement connection adapted to extend between the implement and said one member, and means responsive to the release of said first releasable means and to a predetermined amount of movement of said one member relative to the other in said one direction for releasing said releasable implement connection.

10. For use in an agricultural outfit including a propelling tractor, an implement having a part to be adjusted, and means releasably connecting said implement with the tractor; an implement power lift including a ram unit, a support on the tractor for receiving one end of said unit, a releasable operating connection for shifting said part, means operative by rearward movement of the implement relative to the tractor for releasing said end of the ram unit from its mounting on said support, and means operated by further rearward movement of the implement for interrupting said releasable implement part actuating connection.

FRANK T. COURT.

REFERENCES CITED

The following references are of record in the file of this patent:

UNITED STATES PATENTS

| Number | Name | Date |
| --- | --- | --- |
| 2,283,377 | Lindgren et al. | May 19, 1942 |
| 2,319,492 | Dewey | May 18, 1943 |
| 2,369,436 | Court | Feb. 13, 1945 |
| 2,369,437 | Court | Feb. 13, 1945 |
| 2,422,530 | Court | June 17, 1947 |